(12) United States Patent
Fleming

(10) Patent No.: US 7,752,633 B1
(45) Date of Patent: Jul. 6, 2010

(54) CROSS-PLATFORM EVENT ENGINE

(75) Inventor: Michael Fleming, San Leandro, CA (US)

(73) Assignee: SEVEN Networks, Inc., Redwood City, CA (US)

(*) Notice: Subject to any disclaimer, the term of this patent is extended or adjusted under 35 U.S.C. 154(b) by 1323 days.

(21) Appl. No.: 11/227,323

(22) Filed: Sep. 14, 2005

Related U.S. Application Data

(60) Provisional application No. 60/661,757, filed on Mar. 14, 2005.

(51) Int. Cl.
G06F 13/00 (2006.01)
(52) U.S. Cl. ..................................... 719/318
(58) Field of Classification Search .................. 719/318
See application file for complete search history.

(56) References Cited

U.S. PATENT DOCUMENTS

| | | | |
|---|---|---|---|
| 5,384,892 A | 1/1995 | Strong | |
| 5,729,704 A | 3/1998 | Stone et al. | |
| 5,758,322 A | 5/1998 | Rongley | |
| 5,867,817 A | 2/1999 | Catallo et al. | |
| 5,960,394 A | 9/1999 | Gould et al. | |
| 6,057,855 A | 5/2000 | Barkans | |
| 6,397,230 B1 | 5/2002 | Carmel | |
| 6,727,917 B1 | 4/2004 | Chew et al. | |
| 6,741,232 B1 | 5/2004 | Siedlikowski et al. | |
| 6,771,294 B1 | 8/2004 | Pulli et al. | |
| 6,775,362 B1 | 8/2004 | Ransom | |
| 6,867,774 B1 | 3/2005 | Halmshaw | |
| 6,957,397 B1 | 10/2005 | Hawkins et al. | |
| 6,972,682 B2 | 12/2005 | Lareau et al. | |
| 7,234,111 B2 * | 6/2007 | Chu et al. ................ 715/251 | |
| 7,259,666 B1 | 8/2007 | Hermsmeyer | |
| 7,392,483 B2 * | 6/2008 | Wong et al. ............... 715/746 | |
| 7,483,036 B2 | 1/2009 | Moore | |
| 2002/0089542 A1 | 7/2002 | Imamura | |
| 2003/0063120 A1 | 4/2003 | Wong et al. | |
| 2003/0070061 A1 * | 4/2003 | Wong et al. ............... 712/220 | |
| 2003/0117432 A1 | 6/2003 | Kautto-Kiovula et al. | |
| 2003/0156146 A1 | 8/2003 | Suomela et al. | |
| 2003/0169262 A1 | 9/2003 | Lavelle et al. | |
| 2003/0227745 A1 | 12/2003 | Khoo | |
| 2004/0027326 A1 | 2/2004 | Hays et al. | |
| 2004/0027375 A1 | 2/2004 | Ellis et al. | |
| 2004/0027378 A1 | 2/2004 | Hays et al. | |
| 2004/0043770 A1 | 3/2004 | Amit | |

(Continued)

OTHER PUBLICATIONS

Myers, Brad A. et al., "Extending the Windows Desktop Interface with Connected Handheld Computers," USENIX Windows Systems Symposium, Seattle, Washington, Aug. 3-4, 2000.

(Continued)

*Primary Examiner*—Andy Ho
(74) *Attorney, Agent, or Firm*—Carr & Ferrell LLP

(57) ABSTRACT

A system and method for translating, synthesizing and acting upon disparate event sets is provided. The disclosed cross-platform event engine comprises an event module with information pertaining to various event inputs as they relate to different operating platforms and devices. Logic utilized by the cross-platform event engine determines how to handle a particular event within an operating environment. Methods of updating and training the engine are also provided.

10 Claims, 3 Drawing Sheets

U.S. PATENT DOCUMENTS

| | | | |
|---|---|---|---|
| 2004/0051715 | A1 | 3/2004 | Brokenshire et al. |
| 2004/0068698 | A1 | 4/2004 | Wu et al. |
| 2004/0075695 | A1 | 4/2004 | Chew et al. |
| 2004/0141011 | A1 | 7/2004 | Smethers et al. |
| 2004/0189610 | A1 | 9/2004 | Friend |
| 2004/0266364 | A1 | 12/2004 | Nguyen et al. |
| 2005/0097570 | A1 | 5/2005 | Bomers |
| 2005/0122333 | A1 | 6/2005 | Sumanaweera |
| 2005/0155027 | A1 | 7/2005 | Wei |
| 2005/0235214 | A1 | 10/2005 | Shimizu et al. |
| 2005/0248526 | A1 | 11/2005 | Twerdahl et al. |
| 2005/0278647 | A1 | 12/2005 | Leavitt et al. |
| 2006/0132495 | A1 | 6/2006 | Anderson |
| 2006/0242607 | A1 | 10/2006 | Hudson |
| 2008/0313282 | A1* | 12/2008 | Warila et al. ............... 709/206 |

OTHER PUBLICATIONS

Myers, Brad A. et al., "User Interfaces that Span Hand-Held and Fixed Devices," Proposal to Attend CHI 2000 Workshop on Distributed and Disappearing User Interfaces in Ubiquitous Computing.

Ringel, Meredith et al., "iStuff: A Scalable Architecture for Lightweight, Wireless Devices for Ubicomp User Interfaces," 2002.

B'Far, Reza et al., "Designing Effective User Interfaces for Wireless Devices," Publication Date Unknown, Last Accessed Feb. 2005.

Bergman, Lawrence D. et al., "Programming-by-Demonstration for Behavior-Based User Interface Customization," Workshop on Behavior-Based User Interface Customization 2004.

Signorini, Eugene, "SEVEN's Service-Based Wireless Solutions Enable Enterprises to Untether E-Mail," Yankee Group, Oct. 2004.

Ortiz, C. Enrique, "An Introduction to the Symbian OS Platform for PalmOS Developers," MetroWerks, 2002.

Koeppel, Dan, "GUIs Just Want to Have Fun," Wired Magazine Issue 8.10, Oct. 2000.

Mason, Luke, "Windows XP: New GUI Design Shows Skin is In," Tech Republic, Apr. 4, 2001.

Nokia, "Developer Platforms," Publication Date Unknown, Last Accessed Feb. 2005.

Hardy, Ed, "Microsoft Proposed Two New Thumb-Driven User Interfaces," Brighthand, Apr. 16, 2005.

Karlson, Amy K. et al, "AppLens and LaunchTile: Two Designs for One-Handed Thumb Use on Small Devices," CHI 2005, Portland, Oregon, Apr. 2-7, 2005.

* cited by examiner

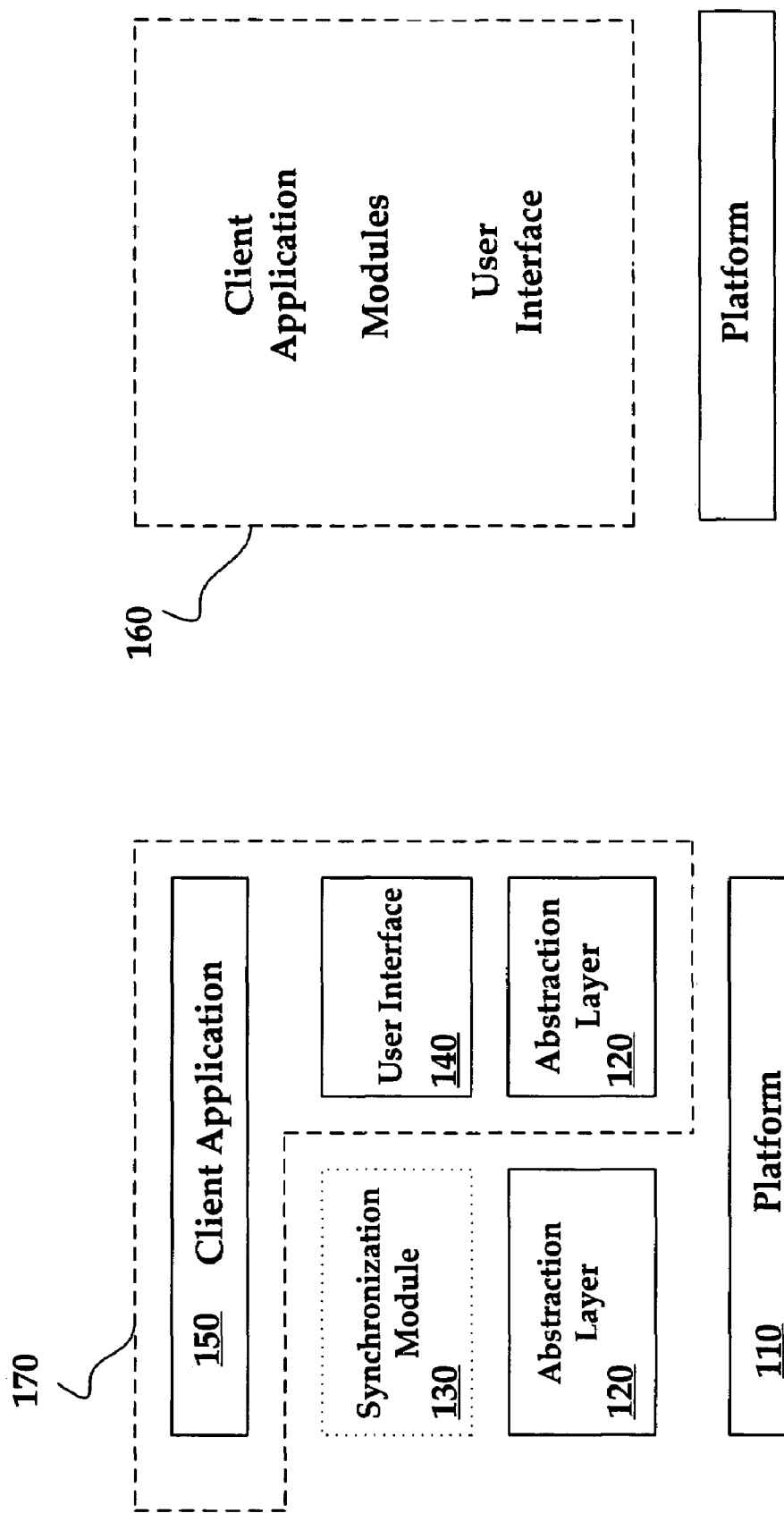

CROSS-PLATFORM EVENT ENGINE

CROSS-REFERENCE TO RELATED APPLICATIONS

This application claims the priority benefit of U.S. provisional patent application No. 60/661,757 filed Mar. 14, 2005 and entitled "Agnostic User Interface for Use in Mobile Devices," the disclosure of which is incorporated herein by reference. This Application is related to U.S. patent application Ser. No. 11/123,540 filed May 5, 2005 and entitled "Universal Text-Entry," the disclosure of which is incorporated herein by reference. This application is also related to U.S. patent application Ser. No. 11/227,013 filed Sep. 14, 2005 and entitled "Intelligent Rendering of Information in a Limited Display Environment"; and U.S. patent application Ser. No. 11/227,272 filed Sep. 14, 2005 and entitled "Rendering Information on a Display Device" (formerly "Platform Neutral User Interface for Mobile Devices". All the aforementioned applications are commonly owned and assigned.

BACKGROUND OF THE INVENTION

1. Field of the Invention

The present invention relates generally to the field of user interfaces. More specifically, the present invention relates to the recognition and processing of platform events by user interfaces, those interfaces operating across various platforms on various mobile devices.

2. Description of the Related Art

Mobile data access devices make it simple and affordable to access corporate and personal data while out of the office. Software allowing for such access is becoming a standard feature on a variety of mobile devices and platforms: BREW, Pocket PCs, Smartphones, Symbian-based phones, PDAs and Internet browsers.

There are approximately 35 million workers that make up the 'mobile workforce,' that is, individuals who carry out all or substantial portions of their job away from a physical office setting. With the increasing number of on-the-go workers, electronic mail continues to be, arguably, the most important business application. As a result, this workforce—as well as the casual individual user—has an inherent need for mobile access to their electronic mail and other data.

Despite an ever-increasing need for access to electronic mail and data, costs of ownership for mobile data access remain a barrier. The issue is no longer whether mobile data access is a necessity but whether it can be deployed and managed in an effective manner.

While cost is an obvious concern in equipping the workforce with the means for accessing data on-the-go, the implementation, development, integration and management of mobile data access solutions are of paramount interest. Despite mobile devices becoming a staple in personal and commercial enterprise, rapidly evolving changes such as number portability, mergers in the telecommunications and software industry and the lack of any one particular technical standard in the mobile device technological space, make providing support for a wide-array of mobile devices an important, albeit difficult, issue with regard to accessing data from a mobile device. The lack of internal expertise, the immaturity of standards, the complexity of integration, device limitations and application development have all been explicitly recognized as barriers to adopting mobile devices for providing access to data while, for example, out of the office or away from a personal desktop computer.

Increased user-flexibility—user familiarity amongst a variety of different devices and/or platforms—may be provided by device-neutral software as is described in the present application. For example, a single application (e.g., a notepad or an e-mail application) could be run on various mobile devices. The user-flexibility proffered by device-neutral software helps to improve IT-familiarity and expertise in that IT personnel need only become familiar with one software application (or suite of applications) instead of a particularized application for each individual platform environment and/or mobile device. Such device and platform neutrality increases end-user adoption of mobile device technologies in their fullest sense thereby better ensuring a return on investment.

But as adoption and pervasiveness of mobile devices and operating platforms increase, so does technological fragmentation within the marketplace. That is, with the increasing availability of differing mobile devices and operating platforms, there is an increase in disjunct technologies and methodologies that evidence an increasing need for standardization. Until there exists an overarching technological standard adopted by or at least a significant portion of the marketplace, developing device- and/or platform-neutral applications, as are taught in the present application, for mobile devices makes application development and testing less of a colossal task for software engineers while ensuring higher quality and better overall design.

Device-neutral user interfaces, like those described in the present application, will play a critical role in mobile device development. Such interfaces must not only provide access to mission critical data but also deal with the realities of variations in screen size, pixel density, aspect ratio and screen use availability amongst devices; limited memory on a mobile device; limited processing power; general quirkiness between platforms; and, perhaps most noticeable to the end-user, the general lack of space for interacting with the mobile device (e.g., keyboard space for text-entry and display space for viewing data). A keyboard, mouse or even a stylus are normally not available for such interaction in a traditional wireless or mobile device. Not only is input difficult, so is viewing a display rendering information. This is especially true when the mobile device happens to also be a cellular telephone.

Engineers have previously been forced to deal with the fact that present-day prior art interfaces are not be suitable for more than one primary set of devices. For example, PDAs utilize a stylus and touch-screen whereas cellular phones may utilize a keypad and/or five-way navigation. If an engineer is satisfied with limiting an interface to a particular type of environment (e.g., platform or device), the engineer must still deal with the nuances of particular device manufacturers (e.g., a Palm PDA versus a Nokia cell phone) and, in some instances, particular device models (e.g., PALM VIIx and Nokia 7110).

An engineer is still, in many instances, limited by the fact that he or she must pre-generate static interfaces or multiple permutations of the interface as they pertain to a particular device or platform family. This results in delays for delivery of applications and increased costs in research and development, which inevitably result in increased costs for the end-user.

There is, therefore, a need in the art for a user interface that is neutral with regard to operating platform and device wherein one client interface will work on multiple platforms and devices.

It should be noted, in the course of this disclosure, that while a device (e.g., hardware) and platform (e.g., software)

are recognized as distinct—albeit related—entities, any reference to a device or a platform should be considered inclusive of both. Similarly, any reference to the neutrality of an interface, in general, should be interpreted as neutrality as to both a device and a platform.

Further, it should be noted that any disclosed device or platform-neutral user interface is not dependent on the presentation or transmission of communications data (e.g., electronic mail, calendar, SMS) or utilization of user data (e.g., data stored on a desktop).

SUMMARY OF THE INVENTION

The present invention advantageously provides a virtual platform neutral to physical device or software/hardware operating platform. The virtual platform comprises an abstraction layer that allows for portability across a variety of mobile devices and operating platforms, especially with regard to user interfaces. The virtual platform and abstraction layer and any related software allow for a user interface on a first device to appear and operate substantially similar to a user interface on a second device regardless of differences or limitations that may exist between the operating systems or physical nuances of the two devices. By providing a device-neutral user interface application, a user can move effortlessly between devices should, for example, the need for replacement or repair of a particular device arise or if the user possess multiple mobile devices (e.g., one device for personal use and a second device for work use).

Additionally, the neutrality of the interface application makes it possible for software developers and engineers to utilize one test suite for a variety of devices or platforms when introducing new features thereby reducing lag-time in delivering applications to market as well as research and development costs. For example, instead of developing five different interfaces for five different devices, one interface may be utilized across five different devices. These reductions in the time and cost of development and delivery inevitably translate into savings for the end-user and/or increases in profit and competitiveness for the application and/or device developer/manufacturer.

The present invention also provides an advantageous cross-platform event engine for recognizing, generating and/or acting upon disparate events amongst a variety of devices or platforms. For example, an event request recognized on one device is translated into a native request recognized on a second device through abstraction and code sharing. Methods for determining the portability of an event from, for example, a first device environment to a second device are also provided. The present invention is not, however, meant to be limited to device-to-device portability as it allows for a common representation of an event outside of its native environment.

BRIEF DESCRIPTION OF THE DRAWINGS

FIG. 1A illustrates an exemplary embodiment of a device platform comprising various operational layers and modules for interaction with a particular device client and as described in the present invention.

FIG. 1B illustrates a device platform comprising various operational layers and modules for interaction with a particular device client as may be found in the prior art.

DETAILED DESCRIPTION OF AN EXEMPLARY EMBODIMENT

Figure 2A:
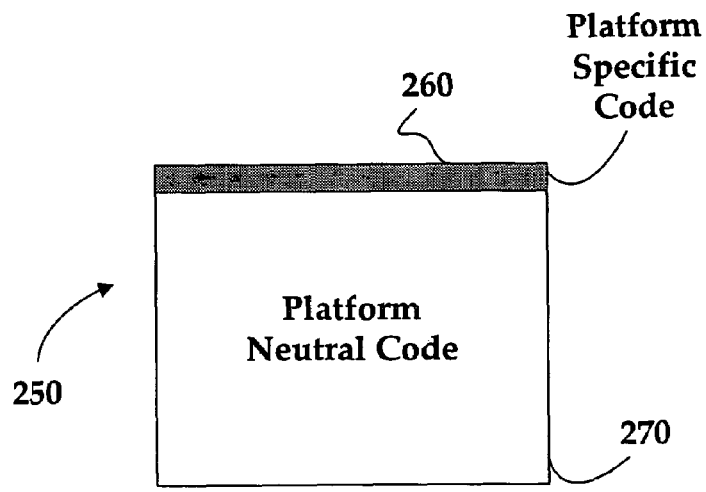
FIG. 2A illustrates an exemplary embodiment of an abstraction layer and a balance of platform-specific code and platform-neutral code as may be found in a device- and/or platform-neutral interface such as that described in the present invention.

FIG. 1A illustrates an exemplary embodiment of a device including various operational layers and modules for interaction with the device. The present embodiment comprises a platform 110, abstraction layers 120, optional synchronization module 130, user interface 140, and client application 150.

Some embodiments of the present invention may comprise additional operational layers such as open or proprietary application program interfaces (APIs) that allow software engineers, programmers and even users of a particular platform and/or device to author or install applications that are compatible with the particular platform's operating environment. A cross-platform event engine may be embodied in such an application. Some embodiments of the present invention may lack certain operational layers or modules, such as synchronization module 130. Such modules would be absent should a particular device or platform not require, for example, synchronization operations.

The platform 110 is the underlying hardware and/or software for a particular operating environment. The platform 110 also defines a particular operating environment in which software, hardware and other applications are developed. An example of platform 110 is the Nokia Series 40 Developer Platform. The Nokia Series 40 Developer Platform can utilize platform technologies such as Java™ J2ME. Another example of platform 110 is the Nokia Series 60 and Series 80 Developer Platforms. The Nokia Series 60 and 80 platforms can utilize C++ in addition to Java™ J2ME technologies. The Palm OS® Platform, as another example of platform 110, supports native programming in C and C++ languages as well as Java programming via third-party Java Virtual Machines. The present invention further envisions the future development of operating environments on a variety of platforms.

Abstraction layer(s) 120 provide basic functionalities and means for accomplishing various operating goals that allow for, in part, the interoperation of the platform 110 with the client application 150 as well as other operational layers such as user interface 140. The abstraction layer(s) 120 provide classes, interfaces, abstract methods and other facilities and resources intended to support various functions and software operations regardless of any particular platform 110 or implementation on any particular device. Abstraction layer(s) 120 may be open or proprietary and are often composed of various information modules (e.g., FIG. 3).

Optional synchronization module 130 comprises the various operational instructions, functionalities and code necessary to allow a particular device or a program residing on such a device to communicate with an external data source, such as a desktop personal computer or enterprise server.

Communications allowing for a synchronization operation can be achieved in a variety of ways including a cable-tohandset synchronization mechanism whereby the device is physically coupled to a desktop personal computer to allow for the exchange and synchronization of data (e.g., electronic mail). Communications can also be achieved wirelessly whereby an enterprise server (e.g., a Microsoft Exchange Server) configured with appropriate software (e.g., SEVEN Server Edition from SEVEN Networks, Inc. of Redwood City, Calif.) coupled with access to a wireless gateway allows for access to electronic mail and other data by the device without any physical connection. Communications can also be achieved without intermediate server software or gateways (e.g., wirelessly).

Synchronization should be appreciated in the most general sense (e.g., as a communication event). For example, synchronization may comprise not only maintaining the consistency of data between two points (e.g., real time calendar data on a handheld device and a desktop computer) but also the duplication of data (e.g., received emails at a desktop forwarded to a handheld). Synchronization may also be utilized for the purpose of updating information (e.g., receiving updated software packages, patches and so forth).

While the optional synchronization module 130 may be necessary for synchronizing the client device and other external data source (e.g., a server), the presence of such a module is not meant to be interpreted as a prerequisite for the operation of a device-neutral user interface.

The user interface 140 comprises and/or is coupled to various modules and software components and source code to allow for the rendering and operation of a user interface on a variety of devices. The user interface 140 comprises or is otherwise coupled to libraries comprising elements and abstractions such as icons, cursors, scroll bars, sounds, animations, etc. and the necessary software and code to enable their use. In an embodiment of the present invention, the user interface 140 is neutral with regard to a particular device or operation environment. That is, a single interface can operate across a plurality of devices (e.g., Nokia, Kyocera and Treo) and/or environments (e.g., Nokia and PalmOS®) without the need to be reprogrammed for each of these particular devices and/or environment. That is, one user interface 140 fits a broad universe of devices and/or environments.

The client application 150 resides on any device coupled to a network (e.g., wirelessly) that allows for access to a server device or other computing entity, such as a second client device. Through the coupling of the device to, for example, a server, the user of the device may receive and transmit data such as electronic mail or access data stored at the server. It should further be appreciated that the present invention may also operate in a device that is not coupled or connected to any particular network or second device.

Small handheld devices are increasingly mobile. This mobility is often a direct result of integrating the handheld device with, for example, a cellular telephone although it is not necessary for the device and related client application 150 to be integrated with a cellular phone or any other particular device.

Mobile devices are often associated with a particular platform 110. For example, the aforementioned Nokia Series 40 Developer Platform is associated with the Nokia 6101 and 6102 model client devices as well as the Nokia 6020, 6235, 6235i and 6822 model client devices. The Nokia Series 60 Developer Platform, on the other hand, is associated with client devices such as the Nokia 6680, 6681, and 6682 model devices. Similarly, the Palm OS® Platform is associated with client devices such as Xplore™ G18, Kyocera 7135, and the Treo™ 650.

FIG. 1B illustrates various operational layers for user interaction and general operation within a particular device as may be found in the prior art. Such a prior art device may comprise the actual platform and various operational layers such as synchronization modules, APIs and so forth.

Prior art devices differ from a device utilized in the context of an embodiment of the present invention in that the client application, user interface and other applications are more integrated, interdependent and operationally incorporated (160) as compared to the present invention (170), which allows for increased flexibility and operability. The 'tightly wound' nature of the prior art is often the result of a general lack of portability of a user interface or any other software between various devices. That is, a particular application, including an interface, is written exclusively for a particular platform and exclusively for a particular device solely in conjunction with that platform. In order for a similar interface with similar functional offerings to operate on another device or platform, that interface must be re-authored in its entirety.

The exemplary device platform illustrated in FIG. 1A, on the other hand, evidences the ability to transport various functionalities from one platform or device to the next, especially with regard to the design of the abstraction layer 120 as is further discussed in the context of FIGS. 2A and 2B, below.

It should be noted that while FIG. 1A illustrates various operational layers as separate elements, this is not to suggest a necessary physical differentiation or a general lack of integration in an embodiment. Similarly, the integration of the client, user interface and abstraction layer (160) in FIG. 1B is not meant to suggest a literal, physical integration. These illustrations are provided merely to aid in the perception of the 'tightly wound' and vertically integrated aspects of the prior art versus an embodiment of the present invention, allowing for cross-platform events processing.

Figure 2B:
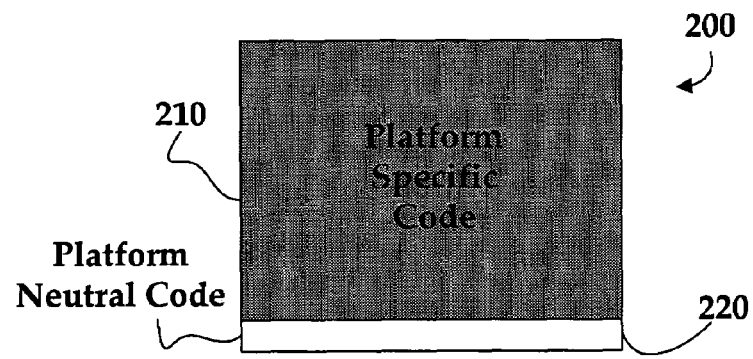
FIG. 2B illustrates a typical balance of platform-specific code and platform-neutral code as may generally be found in the prior art.

FIG. 2B illustrates a balance of platform specific code 210 and platform-neutral code 220 as may be found in the prior art.

For example, and as previously described in the context of FIG. 1B, prior art devices and their related platform and software are generally unitary in nature and are not meant to allow for portability of features, such as a user interface. As such, the prior art code 200 is monolithic in nature and comprised predominantly of platform-specific and application-specific code 210 (e.g., code written for, and only for, a Nokia 6680 device and configured with software written for the Series 60 Developer Platform environment).

This particularized code, while allowing for the integration and operation of a particular device on a particular platform, inhibits the portability of any particular features from one device to another (e.g., a user interface) as may otherwise be provided for with more generalized or device/platform-neutral code 220. Such device/platform-neutral code 220 may comprise code written in accordance with particular industry standards or specifications but that allows for the portability or interoperability of a specific and particular feature amongst devices. This neutral code 220 is minimally—if at all—present in prior art devices.

FIG. 2A illustrates an exemplary embodiment of an abstraction layer 250 and a blend of platform-specific code 260 and platform-neutral code 270 as may be found in a device-neutral user interface offering cross-platform event processing functionality.

An abstraction layer 250, as may be found in an embodiment of the present invention and as illustrated in FIG. 2A, exhibits a much 'thinner' layer of platform- or device-specific code 260. In some embodiments of the present invention, platform specific code may be entirely non-existent. Abstraction layer 250, with its thin layer of platform- or device-specific code 260 may be, generally, the type of abstraction layer 120 as described in FIG. 1A.

As the abstraction layer 250 comprises more platform- or device-neutral code 270, the portability or interoperability of particular features—including a user interface offering cross-platform event processing—is increased in that a feature (e.g., an application or function) will operate on various platforms or devices due to its coding being dependent more on the generalized code 270 than with platform- or device-specific code 260 that limits or inhibits portability or interoperability.

Figure 3:
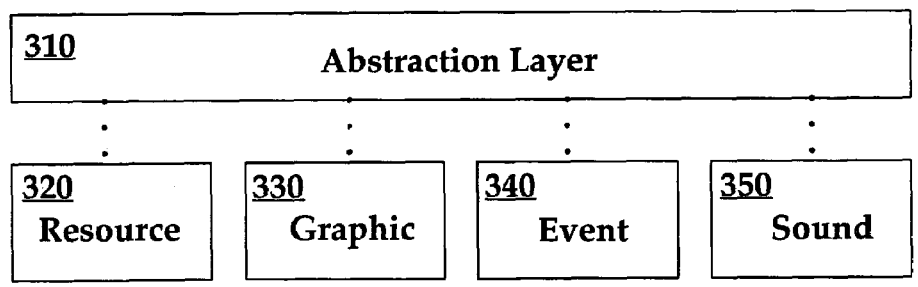
FIG. 3 illustrates an exemplary embodiment of an abstraction layer comprising various informational modules as described in the present invention.

FIG. 3 illustrates an exemplary embodiment of an abstraction layer 310 comprising various informational modules 320-350 as may be implemented in the abstraction layer 250 illustrated in FIG. 2A.

Informational modules 320-350 comprise routines and instructions as they pertain to various operational features of, for example, a particular platform 110 and/or client application 150 linked in the abstraction layer 310. These modules link the particular device to the particular platform.

For example, resource module 320 may comprise specific data or routines utilized in the operation of platform 110, client application 150 and/or device; for example: sleep mode, power on and off in addition to bitmaps, layouts and other libraries of information that are stored on the device or the means for accessing the same.

Graphics module 330 may comprise the information, instructions or knowledge with regard to utilizing specific files such as JPEGs, bitmaps or other graphic data that could be utilized by user interface 140 in its rendering of a user interface on a device. The graphics module 330 may retrieve these files from resource module 320.

Event module 340 may comprise a library of information, instructions or knowledge with regard to identifying actions or occurrences as may be detected by a particular program such as user actions (e.g., pressing a key) in addition to system occurrences (e.g., an internal calendar alarm) and how to translate them across various environments (e.g., as if they were executed in a native environment).

Sound module 350 may comprise the information) instructions or knowledge of how to play or emit various sounds (e.g., WAV files) to be generated in response to, for example, the occurrence of certain system events (e.g., system warnings concerning low battery power). Sound module 350 may retrieve that particular file from the resource module 320.

Abstraction layer 310, as it corresponds to abstraction layer 120 (FIG. 1A) and abstraction layer 250 (FIG. 2A) may comprise additional or fewer modules as is required by the particular platform 110 and/or device and/or client application 150. It should also be noted that while FIG. 3 illustrates various modules as separate elements, this is not to suggest the requirement of a physical differentiation or a general lack of integration in an embodiment of the present invention.

Figure 4:
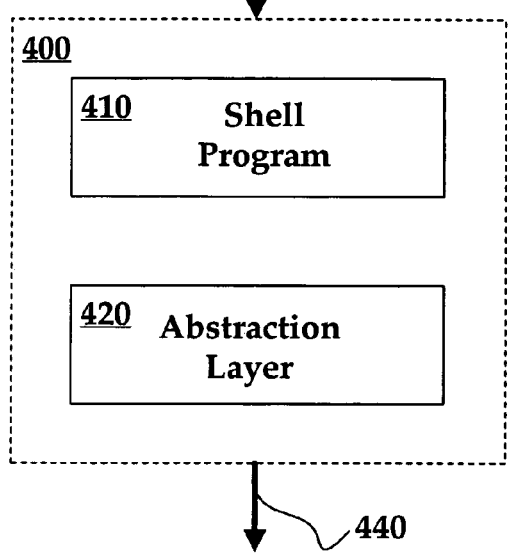
FIG. 4 illustrates an exemplary embodiment of a virtual platform comprising a shell program and an abstraction layer as may be utilized in the present invention.

FIG. 4 illustrates an exemplary embodiment of a virtual platform 400 for event management and translation comprising a platform-specific shell program 410 and an abstraction layer 420. In some embodiments of the present invention, the abstraction layer 420 and shell program 410 may be a single module of software.

Abstraction layer 420 is similar to the layer described in FIG. 3. Abstraction layer 420 interacts with the shell program 410 to effectively translate or otherwise offer portability of commands or instructions issued by a device-neutral interface or other platform environment as if the commands were actually issued in the native platform associated with the client. For example, if an event 430 (e.g., a button press) occurs in a particular platform environment (e.g., the Nokia Series 40 Developer Platform) that event 430 might—and likely will—substantially differ in structure and content (i.e., syntax) relative a different platform (e.g., the Palm OS®).

Virtual platform 400 is capable of normalizing the syntax (e.g., code) of the two different platform environments into a common format (e.g., a common syntax format with reliable semantic structure). That is, the virtual platform 400, in conjunction with abstraction layer 420, provides the necessary translation so that the syntax of the two platforms (e.g., code related to the button press) may be reconciled to achieve the related semantic purpose (e.g., invoking the opening of a particular menu or activating a backlight as associated with a soft key selection event 430) in, for example, a device-neutral interface.

The event 430 or certain information generated by the event 430 (e.g., a notification of the event) is, in certain instances, intercepted by the shell program 410. In some instances, the event 430 may be 'passed' upon by the shell program 410. This 'pass' may be the result of the event 430 not requiring 'translation' or platform 400 and shell program 410 not being concerned with the particular event 430. This 'pass' determination may be the result of certain manual programming of the platform 400 before or after it leaves an original equipment manufacturer or as the result of training, updating by the user or installation of software patches and the like.

The shell program 410, should it intercept the event 430, prevents the event 430 or the information generated by the event 430 (e.g., a notification of the event) from being immediately processed by any other relevant logic on the actual device or platform. The abstraction layer 420 then processes the event 430 intercepted by the intermediary shell program 410 and determines the proper response, reaction and/or instruction 440 to the event 430 for the particular device and/or platform hosting virtual platform 400.

The proper response, reaction and/or instruction 440, in some instances, will be to translate the event 430. The proper response 440, in other instances, will be to pass the event 430 on to some other aspect of the device for management. The proper response 440, in yet another instance, may be to 'null' the event 430 and not allow it to be processed or translated by the platform 400 and/or any other element of the device.

An event 430 generally falls into one of three categories. The first category may generally be described as a one-to-one translation. That is, the event 430 occurs and results in a particular reaction. For example, a button is pressed and a character (eventually) appears on the screen. This reaction is the result of the event 430 (or a notification of the event 430) notifying the appropriate device elements of the occurrence (the button press) and/or invoking the necessary code and/or routines to generate, for example, the aforementioned character.

It should be understood that the event 430 and the eventual response 440 are not necessarily a direct relationship (e.g., the button press does not directly cause the appearance of a character on the screen). The button press, instead, may be recognized by the device, a notification of the recognition of the occurrence thereby causing the execution of certain instruction sets that, in turn, cause a display or graphics module to render the letter 'A' on the display screen.

The second category of event 430 may generally be described as a synthetic event. In this instance, an action is recognized but the related function is not immediately present. The function, in this instance, must be synthesized to correspond to the event 430. For example, a particular command in an interface environment may be recognized but not present on a particular device. In this case, the issuance of the particular command causing the device to undertake the desired action would be synthesized and executed.

The third category of event 430 may be described as an ad hoc synthetic event wherein a series of actions occur internally. That is, one event 430 (the button press) results in the generation of a second event 430 (the execution of command code), which in turn results in the occurrence of some action by another element (e.g., hardware or a software module) of the device.

It should be noted that in some instances, the proper response/reaction 440 may be inaction. That is, the platform 400 does nothing in response to the event 430. Similarly, the platform 400 may take a 'wait-and-see' approach and wait for the occurrence (or non-occurrence) of a subsequent event 430. This 'wait-and-see' approach would be apropos in the instance of a timer-related situation such as triple-tap text entry. Ultimately, the appropriation response/reaction 440 will be dependent upon the context of the event 430 as may be governed by, for example, a particular software application.

For example, the aforementioned button-press in a Nokia Series 40 Developer Platform operating environment may be equated to activating a backlight for a display screen. In another operating environment, however, the button press may be associated with sending a device into a 'sleep' state or may lack an associated function altogether. Absent the virtual platform 400, a user-interface would be unable to communicate the semantic content of the button press (e.g., undertake a particular action or cause a particular result) to both the Nokia platform and an alternate platform, such as the Palm OS®, as the syntax between the two platforms would differ.

Utilizing the virtual platform 400, however, the shell program 410 (in a Nokia platform environment, for example) would intercept and recognize the button press event 430 as indicative of the user's desire to enter sleep mode and communicate with the abstraction layer 420 in order to translate the event 430 into the proper response 440 for a Nokia-related device, which may normally be associated with a double press of another button. Similarly, the same virtual platform 400, when installed on a Palm OS® device could aid in translating the event 430 into a response 440 as recognized by a Palm OS® related device. A command issued by or in the context of a non-native device-neutral interface is recognized and translated, if necessary, for processing as if initially issued in the native device/platform environment. For example, a user could issue a sleep command as associated with a particular button as proffered by the device-neutral user interface and that button press, in part because of virtual platform 400, will be translated and recognized on a multitude of devices and/or platforms.

Figure 5:
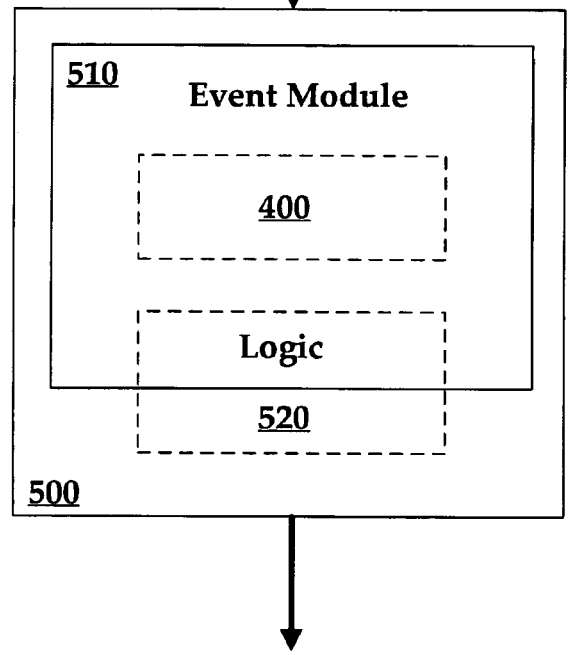
FIG. 5 illustrates a cross-platform event engine as may be utilized in an exemplary embodiment of the present invention.

FIG. 5 illustrates a cross-platform event engine 500 as utilized in an exemplary embodiment of the presently described device-neutral user interface. Cross-platform event engine 500 comprises an event module 510 and related logic 520. Logic 520 may reside directly in the event module 510 or may be resident in other aspects of the engine 500 or the device. In FIG. 5, logic 520 is illustrated as residing in both the event module 510 and also in the greater event engine 500. The particular location of logic is not of particular consequence so long as the appropriate logic 520 is accessible by the engine 500 as needed. In that regard, logic 520 may also be present in individual hardware elements or software modules of a device.

An embodiment of the cross-platform event engine 500 translates and manages events 430 occurring in/on or in relation to a particular device and/or device-neutral interface (e.g., key down, up, or center press) into a syntax recognizable by the particular device wherein the interface (and its engine 500 and virtual platform 400) are operating. The cross-platform event engine 500 further ensures the presence and standardization of certain events (e.g., press-and-hold and key repeats) via synthesis, if necessary.

Event module 510 comprises information as it pertains to the recognition of certain events on various devices and/or platforms and to translate these events into a common syntax recognizable by the device so that the semantic content of the event is achieved or communicated to another element of the device. These events include information obtained from event module code and external sources of data, both on and off the device. For example, event module 510 may be programmed to correlate a press of a particular button (e.g, the '1' number key on a certain device or in a certain platform environment) to result in a translation notification for the mobile device to activate its telephone functionality and automatically dial into a voice mail account assigned to that particular mobile device. This occurrence is the result of translating that event and its intended semantic result (the button press causing voice mail access) into a syntax comprehensible by the particular device. That is, button press '1' (in the context of the device-neutral interface) is mapped to telephone and voice mail functionality. In this way, a user may correlate certain actions to certain results notwithstanding the particularities of a given operating platform and/or environment (e.g., button press of '1' will always result in voice-mail access).

While an embodiment of event module 510 may comprise an abstraction layer (420) and logic 520, event module 510 may not necessarily include the aforementioned shell program 410, the program (in certain embodiments) being incorporated as a part of the abstraction layer 420 or some other aspect of event engine 500.

The information residing in the event module 510 and pertaining to event translation and management can be installed by an original equipment manufacturer or may be subject to user adjustment (e.g., deactivating default settings and/or imposing new settings) or subsequent software installations (e.g., upgrades and software patches). Information in the event module 510 may also be updated automatically during the operation of the device (e.g., wirelessly) or configured as the result of intelligent determinations by the engine 500.

For example, if the event module 510 determines that it is resident on a device for which it does not know what result should/will be triggered by the press of the '1' key, the event module 510 can make certain assumptions based on a particular series of a device but not the exact model. That is, by analyzing operational parameters of similar devices (that information residing in the module 510 or otherwise accessible by the module 510), the event module 510 may assume and provide relevant information from which logic 520 and cross-platform event engine 500 can collectively translate an event input.

For example, a family of devices may recognize a press of the '1' key as triggering (via a series of internal events) voice mail functionality. As a present device may be similar to, or even a member of, this device family, the present device utilizing the event engine 500 may translate the press event in a similar manner, that is, activating voice mail functionality.

The event module 510 may also receive updates with regard to device information or code during a synchronization/update/communication operation/event with another source of data/information (e.g., a P2P network, desktop PC, or server that hosts information pertinent to the device's operation). Updates may be acquired automatically or as a result of user action (e.g., affirmatively downloading an upgrade or patch from the appropriate provider of that information such as the device manufacturer or the platform-neutral interface designer). Such updates, as previously suggested, may also be received wirelessly over a wireless network from a corresponding data source.

The event module 510 may also request the user manually provide this information if an assumption or synchronization/update/communication operation/event fails to provide or otherwise obtain the necessary information.

Events and their related notifications (if any) need not be of any particular format or language so long as the event may be processed by the cross-platform engine 500 with regard to determining whether a particular application, sub-event, display, sound, etc. should be ultimately be executed. The same holds true for a proper response/reaction 440.

An embodiment of the cross-platform event engine 500 also comprises aforementioned logic 520 although other embodiments of the present invention allow for logic 520 to be located elsewhere on the device. The logic 520, based on an event input, interacts (e.g., query/reply) with event module 510 to determine if the particular event input may be processed on the particular device (e.g., a one-to-one translation) or if some adjustments will be required (e.g., synthesis) with regard to the particular configuration of the device as set forth in the event module 510. For example, logic 520 will, in conjunction with event module 510, determine: (1) if an event can be processed by the device and if it should; (2) if the event cannot be processed by the device but it should; and (3) if an event should not be processed by the device and to ensure that it is not. Logic 520 determines what to do with an event (i.e., what action, reaction, inaction is warranted?): allow the event module 510 to carry out an action in response to event or allow some other aspect of the device (e.g., the client) to carry out an action in response to the event.

If logic 520 determines that the event input can be identified and should be processed and subsequently executed, the event input will be processed (e.g., standardized with regard to syntax) by event module 510 as to allow for the proper reaction/response to take place in the device (e.g., one-to-one translation or a 'pass' of the event).

For example, the user presses the '1' key (event input). The cross-platform event engine 500 will accept the event input and the logic 520 will communicate with the event module 510 with regard to the event engine 500 having received this particular input. If the logic 520 determines that the event should be processed, the event module 510 (presuming it to have been programmed with this particular information) will recognize that on the present device, a press of the '1' key is meant to execute a telephone call to the user's voice mail. The event engine 500 will communicate the identification of this event to the appropriate elements of the device ultimately resulting in the activation of telephone functionality and a telephone call to the user's voice mail.

Should logic 520 and event module 510 determine that the requested operation is not immediately compatible with the present device (e.g., the device does not utilize a hard key press for voice mail access but a soft key selection, logic 520 may determine that a query to event module 510 is necessary to determine what the particular configuration of the device allows for the identical or similar operation and, if so, whether the particular event can be converted, translated or otherwise managed in such a way that will ultimately result in the invocation of an identical or similar operation.

For example, if the engine 500 recognizes that a hard key press is being executed, logic 520, after having accessed the event module 510 to determine what should be done with the key press event (that is, the notification of the event), may recognize that this particular event is usually associated with voice mail access. Logic 520, in conjunction with the event module 510, will determine that while voice mail access is possible on the present device, voice mail access is usually initiated via a soft key selection event. The cross-platform event engine 500 will convert the initial event into the proper request for the native environment (i.e., the operating system relative the device) whereby access to voice mail will eventually occur via the proper execution of other strings relative various elements in the device notwithstanding the fact that a differing input 530 syntax actually initiated the request on the device. That is, the semantics of the hard key press (access voice mail) is achieved via translation such that differences in syntax between the interface and device are overcome.

Information utilized by logic 520 and also for event module 510 as it pertains to translation and management of events may reside directly in the engine 500 or at a locale on the device accessible by the engine 500. For example, information pertaining to common events may be a permanently embedded part of logic 520 or in memory (not shown) accessible by the logic 520.

In certain embodiments, the logic 520 and event module 510 may be trained, whereby the engine 500 begins to recognize a particular event input without query to the event module 510 or a determination of how to handle to the event by logic 520. Through the training of the engine 500 and its various elements, there is no longer the need for unnecessary logic execution cycles or interactions with the event module 510 whereby the processing speed of an event by the engine 500 is normally decreased.

The logic 520 and/or event module 510, in some embodiments, may also be expressly instructed by the user (e.g., through pre-programming or a response to a query during processing) to respond to a particular difference in configuration as identified by the engine 500 in a particular manner. For example, if the event input pertains to the particular timing of a key press to invoke a particular application, the user may pre-program the logic engine 520 to automatically respond to that event relative the event module 510 as to launch that application (e.g., as a default) instead of logic 520 determining how to handle the event and subsequently interacting with the event module 510 to properly translate and/or manage the event. Such express instruction may also help avoid arrival at an erroneous result as to the particular nature of the event and how it may be processed in its native environment (e.g., the event module 510 improperly maps the event to a response/reaction on or in the device).

In that regard, the cross-platform event engine 500 can further be configured to recognize that the user of the device is perhaps most familiar with a particular operating system platform or mobile device. In that regard, the logic 520, in conjunction with event module 510, may recognize that an event is consistently mapped to a backlight function. The event invoking the backlight function may correspond to an event as would occur in a PalmOS® for that function. As such, the interface (via engine 500) may be reconfigured to reflect a PalmOS®-type interface and also default map as if events were occurring in a PalmOS® environment. Through such re-mapping, in the event there is a disparity as to what event a user actually seeks to execute through an event input, those events that relate to the user's more familiar platform or device are considered and/or invoked prior to considering any other particular events as they relate to less familiar devices or platforms (e.g., the engine 500 may query the user if they wish to operating in Palm-mode).

For example, a first device may associate a particular key press with attempting to access voice mail. A second device may associate the same key press with launching an electronic mail program and wirelessly accessing the Internet. In an interface comprising cross-platform event engine 500, the event module 510 will be programmed with information concerning events as they relate to both devices (e.g., a key press relating to voice mail on the first device and electronic mail on the second). When the event input (button press) is received by the cross-platform event engine 500, logic 520 will determine what to do with the event and, if appropriate, query the event module 510 to direct the notification of the key press to the appropriate element of the device (e.g., a voice mail module or an e-mail module) and to translate the notification into a syntax recognized by the device. Having been previously programmed to note or learn/been trained that the user formerly was a 'first device' user, however, logic 520 will determine to send the proper notification to the voice mail module and the event module 510 will convert the input into a syntax compatible with voice mail access thereby resulting in voice mail access (through appropriate instruction/action/reaction) rather than electronic mail and Internet access as would be appropriate had the user been a former 'second device' user.

An embodiment of the cross-platform event engine 500 also allows for cross-platform representation of strings and other executables.

As noted, the event module 510 of the cross-platform event engine 500 may be integrated with the virtual platform 400 and its abstraction layer 420 that allows for the interoperability of a device-neutral user interface on any variety of devices and/or platforms. This integration may also include integration with other engines such as a layout engine as described in U.S. provisional patent application No. 60/661,757, which has been incorporated herein by reference. While the cross-platform event engine 500 and virtual platform 400 need not necessarily be physically integrated, the platform-neutral user interface of the present invention requires that the two components at least be capable of communicating with one another as to allow for the translation of what may be a foreign instruction into an instruction otherwise comprehensible by the cross-platform event engine 500.

The above-described embodiments are exemplary. One skilled in the art will recognize and appreciate various applications of the disclosed invention beyond those presently described here. This disclosure is not meant to be limiting beyond those limitations as expressly provided in the claims.

What is claimed is:

1. A system for handling event input between disparate software or hardware platforms, the system comprising:
   an event module stored in memory and executable by a processor to:
   recognize an event associated with a first platform, the event having semantic context, and
   translate the event into a syntax recognizable by a second platform whereby the semantic context of the event associated with the first platform is communicated to a component of the second platform; and
   software stored in memory and associated with the component of the second platform, wherein the execution of the software by a processor causes the translated syntax of the event module to effectuate the semantic context of the event for the first platform at the component of the second platform.

2. The system of claim 1, wherein the event module is configured by an original equipment manufacturer.

3. The system of claim 1, wherein the event module is configured by a user.

4. The system of claim 1, wherein the event module is updatable.

5. The system of claim 1, wherein the event module is updated during a communication event.

6. The system of claim 1, wherein the event is automatically generated by the hardware or software platform.

7. The system if claim 1, wherein the event is user-initiated.

8. The system of claim 1, wherein the event module utilizes an assumption in translating the event into the syntax.

9. The system of claim 1, wherein the event is a request to invoke a functionality of the hardware or software platform.

10. The system of claim 1, wherein the event is a key press.

* * * * *

UNITED STATES PATENT AND TRADEMARK OFFICE
CERTIFICATE OF CORRECTION

Page 1 of 1

PATENT NO.         : 7,752,633 B1
APPLICATION NO.    : 11/227323
DATED              : July 6, 2010
INVENTOR(S)        : Michael Fleming It is certified that error appears in the above-identified patent and that said Letters Patent is hereby corrected as shown below:

In column 14, line 33, in Claim 7, delete "if" and insert -- of --, therefor.

Signed and Sealed this
Twelfth Day of July, 2011

David J. Kappos
*Director of the United States Patent and Trademark Office*